United States Patent
Ap et al.

(10) Patent No.: US 12,101,146 B2
(45) Date of Patent: Sep. 24, 2024

(54) ANTENNA SWITCHING FOR IMPROVED IN-DEVICE CO-EXISTENCE PERFORMANCE

(71) Applicant: Intel Corporation, Santa Clara, CA (US)

(72) Inventors: Santhosh Ap, Bangalore (IN); Madhukiran Sreenivasareddy, Bangalore (IN); Vamshi Krishna Aagiru, Bangalore (IN); Praveen Kumar, Bangalore (IN); Nithesha Ananda, Surathkal (IN)

(73) Assignee: INTEL CORPORATION, Santa Clara, CA (US)

( * ) Notice: Subject to any disclaimer, the term of this patent is extended or adjusted under 35 U.S.C. 154(b) by 63 days.

(21) Appl. No.: 18/049,651

(22) Filed: Oct. 26, 2022

(65) Prior Publication Data
US 2023/0387978 A1 Nov. 30, 2023

(30) Foreign Application Priority Data
May 27, 2022 (IN) .............................. 202241030608

(51) Int. Cl.
*H04B 7/06* (2006.01)
*H04B 17/336* (2015.01)

(52) U.S. Cl.
CPC ......... *H04B 7/0608* (2013.01); *H04B 17/336* (2015.01)

(58) Field of Classification Search
CPC ............................ H04B 7/0608; H04B 17/336
See application file for complete search history.

(56) References Cited

U.S. PATENT DOCUMENTS

| | | | | |
|---|---|---|---|---|
| 8,908,667 | B1* | 12/2014 | Wong | H04W 72/1215 370/327 |
| 9,231,686 | B2* | 1/2016 | Chen | H04B 7/0822 |
| 11,658,755 | B2* | 5/2023 | Kogiantis | H04B 17/345 375/262 |
| 2003/0083016 | A1* | 5/2003 | Evans | H04B 7/0691 455/67.11 |
| 2011/0249576 | A1* | 10/2011 | Chrisikos | H04B 7/0691 370/252 |
| 2011/0250926 | A1* | 10/2011 | Wietfeldt | H01Q 1/243 455/525 |
| 2013/0072135 | A1* | 3/2013 | Banerjea | H04B 1/525 455/78 |
| 2014/0349584 | A1* | 11/2014 | Clevorn | H04B 7/04 455/67.13 |
| 2014/0370824 | A1* | 12/2014 | Larsen | H04B 7/12 455/77 |
| 2016/0127006 | A1* | 5/2016 | Majjigi | H04B 7/0802 455/78 |
| 2017/0141801 | A1* | 5/2017 | Watanabe | H03H 9/64 |

(Continued)

*Primary Examiner* — Jaison Joseph
(74) *Attorney, Agent, or Firm* — VIERING, JENTSCHURA & PARTNER MBB

(57) ABSTRACT

A mobile communication device including a processor configured to: retrieve a first isolation metric from a lookup table between an antenna and a first further antenna; retrieve a second isolation metric from a lookup table between the antenna and the second further antenna; determine that the second isolation metric is greater than the first isolation metric; and switch transmitting the signal from the first further antenna to the second further antenna.

16 Claims, 15 Drawing Sheets

(56) References Cited

U.S. PATENT DOCUMENTS

| | | | | |
|---|---|---|---|---|
| 2017/0187412 | A1* | 6/2017 | Han | H04B 1/40 |
| 2021/0384939 | A1* | 12/2021 | Klomsdorf | H01Q 1/243 |
| 2022/0255239 | A1* | 8/2022 | Islam | H01Q 1/243 |
| 2023/0387978 | A1* | 11/2023 | Ap | H04B 7/0608 |

* cited by examiner

FIG. 6

| Scenario 602 | WWAN Operating band 604 | WLAN Co-ex band 606 | WLAN Antenna 608 | WWAN Ant-1 Isolation (dB) 610 | WWAN Ant-2 Isolation (dB) 612 | WWAN Ant-3 Isolation (dB) 614 | WWAN Ant-4 Isolation (dB) 616 |
|---|---|---|---|---|---|---|---|
| Open lid/Clamp-shell scenario 618 | B40 | 2.4GHz | Ant-1 | 25 | 30 | 17 | 20 |
| | B40 | 2.4GHz | Ant-2 | 28 | 24 | 21 | 15 |
| | ... | ... | ... | ... | ... | ... | ... |
| | N79 | 5GHz | Ant-1 | 27 | 30 | 19 | 22 |
| | N79 | 5GHz | Ant-2 | 30 | 26 | 23 | 17 |
| Closed lid scenario 620 | B40 | 2.4GHz | Ant-1 | 5 | 13 | 15 | 18 |
| | B40 | 2.4GHz | Ant-2 | 12 | 6 | 15 | 13 |
| | ... | ... | ... | ... | ... | ... | ... |
| | N79 | 5GHz | Ant-1 | 7 | 15 | 17 | 20 |
| | N79 | 5GHz | Ant-2 | 14 | 8 | 21 | 15 |
| Tent or 45 degree mode 622 | B40 | 2.4GHz | Ant-1 | 13 | 18 | 17 | 20 |
| | B40 | 2.4GHz | Ant-2 | 16 | 12 | 21 | 15 |
| | ... | ... | ... | ... | ... | ... | ... |
| | N79 | 5GHz | Ant-1 | 15 | 20 | 19 | 22 |
| | N79 | 5GHz | Ant-2 | 18 | 14 | 23 | 17 |
| 360 degree mode 624 | B40 | 2.4GHz | Ant-1 | 7 | 15 | 15 | 18 |
| | B40 | 2.4GHz | Ant-2 | 14 | 8 | 19 | 13 |
| | ... | ... | ... | ... | ... | ... | ... |
| | N79 | 5GHz | Ant-1 | 9 | 17 | 16 | 20 |
| | N79 | 5GHz | Ant-2 | 16 | 10 | 20 | 17 |

| PARAMETER | MIN. | TYP. | MAX. | UNITS |
|---|---|---|---|---|
| $V_{DD}$ Supply Voltage | 1.55 | 1.8 | 1.95 | V |
| $V_{DD}$ Supply Current | | 57 | 80 | µA |
| $C_{TL1}$ Logic Low Voltage | 0.00 | 0.00 | 0.45 | V |
| $C_{TL1}$ Logic High Voltage | 1.3 | 1.8 | 2.5 | V |
| $C_{TL1}$ Logic High Current | | 0.1 | 5 | µA |
| Turn-On Time | | | 20 | µs |
| Switching Speed (Ctl High to RF 90%) | | 2.5 | 3 | µs |

1100, 1102, 1104

ANTENNA SWITCHING FOR IMPROVED IN-DEVICE CO-EXISTENCE PERFORMANCE

CROSS REFERENCE TO RELATED APPLICATIONS

This application claims priority to Indian Application number 202241030608, filed on May 27, 2022, the contents of which are herein incorporated by reference in its entirety.

TECHNICAL FIELD

This disclosure may generally relate to the field of wireless communications.

BACKGROUND

Wireless communication devices which include multiple antennas may need to coexist together in a small form factor. For example, a user equipment (UE) may include one or more antennas for wireless local area network (WLAN) communication and one or more antennas for wireless wide area network (WWAN) communication. The WLAN and WWAN antennas may interfere with one another when the multiple radios operate simultaneously. Radio performance may degrade due to the interference of WWAN and WLAN communication. For example, the LTE Band-7, Band-40 & Band-41 may interfere with Wi-Fi 2.4 GHz bands or NR bands N77 & N79 may interfere with Wi-Fi 5 GHz bands or higher. This disclosure proposes techniques to improve the in-device coexistence of different antennas by switching between one or more of a first type of antenna so that communication through the first type of antenna interferes the least with communication through a second type of antenna.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, the disclosure may be described with reference to the following drawings, in which:

FIG. 6 illustrates an exemplary LookUp Table (LUT).

FIG. 11 illustrates an exemplary improvement in de-sense performance based on antenna switching.

DETAILED DESCRIPTION

In the following detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Wireless communication devices may include multiple antennas communicating on different frequency bands. Techniques to avoid interference between multiple antennas may include Non-real time (NRT) and real time (RT) coexistence techniques between WWAN and WLAN communications. However, NRT coexistence techniques may require Bulk Acoustic Wave (BAW) filters to support simultaneous WWAN and WLAN communication. BAW filters are expensive and increase the cost of a wireless communication device without completely eliminating the interference. NRT coexistence techniques may include WLAN channel selection to avoid interference with WWAN communication. However, this limits WLAN communication to channels with lower interference of WWAN communication.

Wireless communication devices with multiple antennas may include isolation between the different antennas. For example, system design aspects of wireless communication devices such as proximity and coupling may isolate WWAN antennas from WLAN antennas. The isolation between two antennas may reduce interference between the two antennas. For example, even a few dBs of improvement in antenna isolation between a WWAN antenna and a WLAN antenna may enhance WLAN performance.

Switching between two antennas of a first type based on their isolation relative to a third antenna of a second type may improve performance. For example, switching between two WWAN transmission (Tx) antennas based on their isolation from a WLAN antennas may improve WLAN performance. By switching from WWAN antenna that has less isolation from the WLAN antenna to a WWAN antenna that has greater or the greatest isolation from the WLAN antenna may reduce interference between WWAN and WLAN communication.

After switching between two WWAN antenna, a WLAN module may measure Signal to Noise Ratio (SNR) to verify that SNR has improved or meets an SNR threshold. The antenna switching technique may improve wireless communication by improving reception (Rx) sensitivity and throughput. The switching technique may take advantage of isolation built into the design of a wireless communication device without requiring expensive BAW filters.

Figure 1:
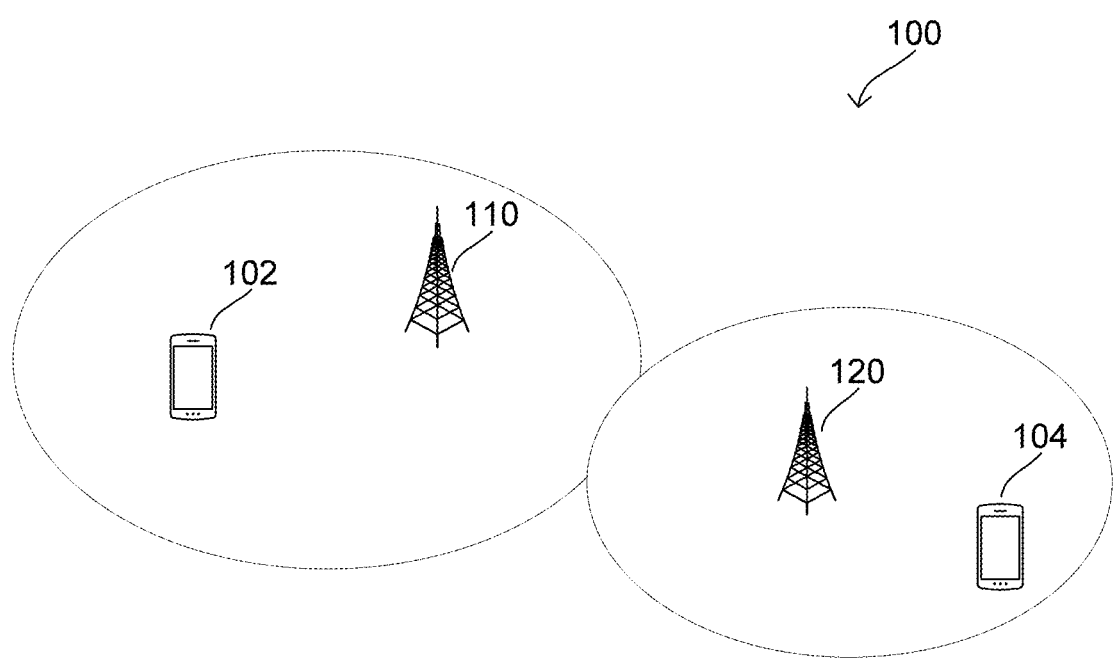
FIG. 1 illustrates an exemplary radio communication network.

FIG. 1 shows exemplary radio communication network 100, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wi-Fi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or Wi-Fi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, Wi-Fi, mmWave, 5G NR, and the like, any of which may be applicable to radio communication network 100.

Figure 2:
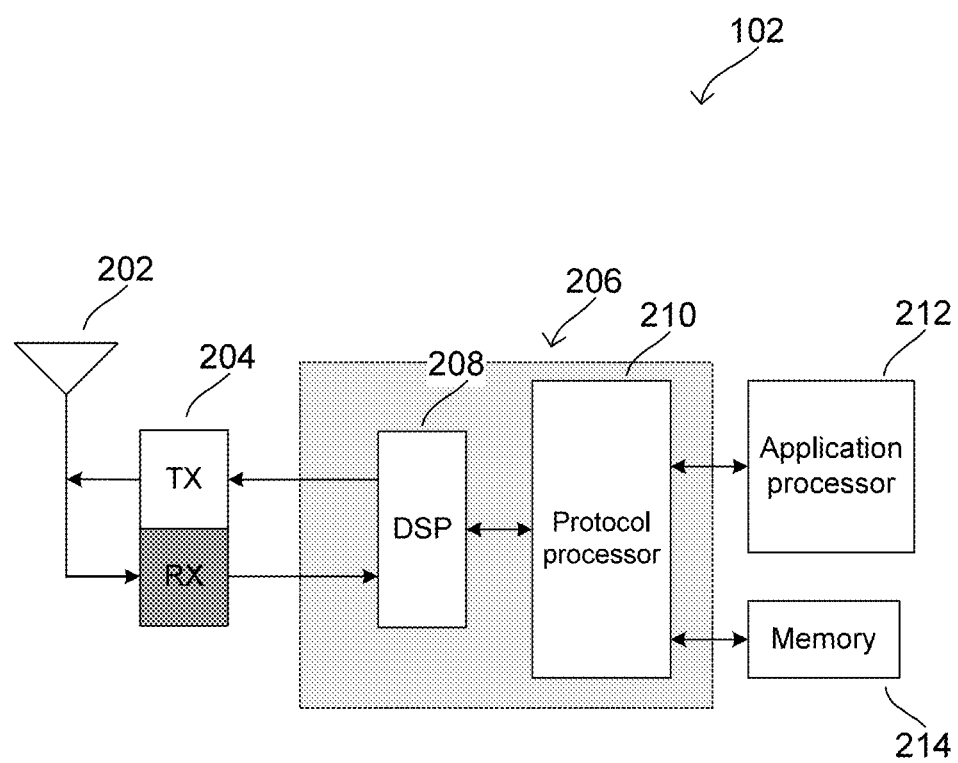
FIG. 2 illustrates an exemplary internal configuration of a terminal device.

FIG. 2 shows an exemplary internal configuration of terminal device 102, which may include antenna system 202, radio frequency (RF) transceiver 204, baseband modem 206 (including digital signal processor 208 and protocol controller 210), application processor 212, and memory 214. Although not explicitly shown in FIG. 2, terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. Antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. Baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O (input/output) instructions (e.g., software and/or firmware) stored in a non-transitory computer-readable storage medium), or as a combination of hardware and software components. Digital signal processor 208 may include one or more processors configured to retrieve and execute program code that defines control and processing logic for physical layer processing operations. Digital signal processor 208 may execute processing functions with software via the execution of executable instructions. Digital signal processor 208 may include one or more dedicated hardware circuits (e.g., ASICs (Application Specific Integrated Circuits), FPGAs (Field Programmable Gate Arrays), and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. The processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. If the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Logically switching wireless communication from one antenna to another antenna so that it does not interfere with wireless communication on a third antenna may improve overall performance of a wireless communication device such as terminal device 102. While the examples below may discuss switching antennas for WWAN Tx to avoid interference with WLAN Tx, it should be understood that the techniques described can be applied to other communications and other antenna types.

Figure 3B:
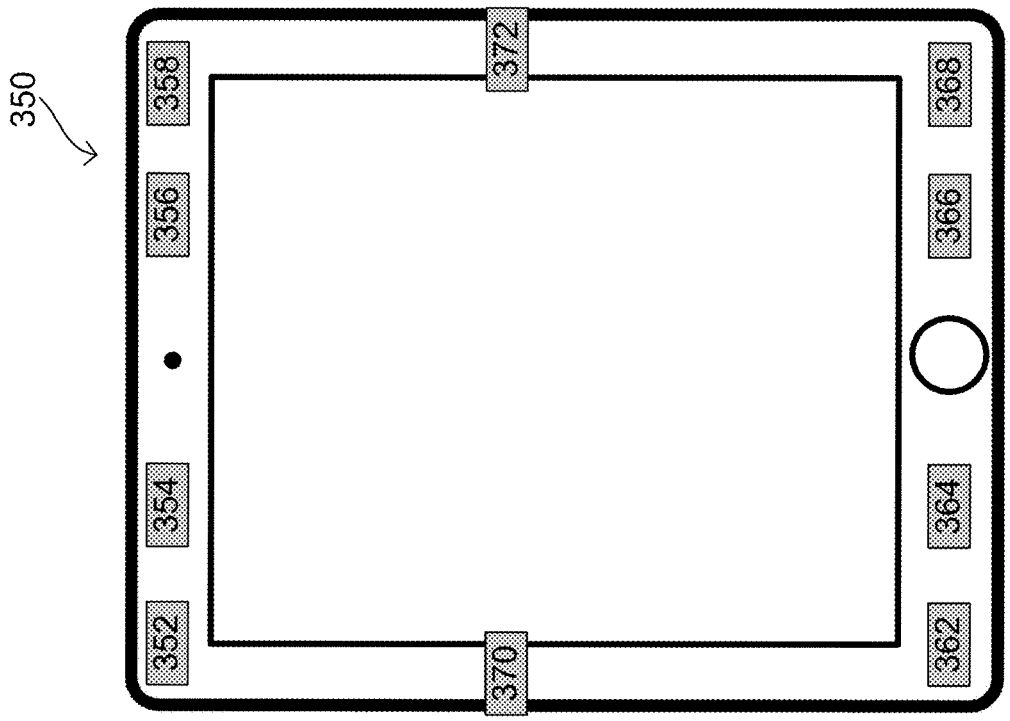
FIGS. 3A and 3B illustrate exemplary terminal devices.
Figure 3A:
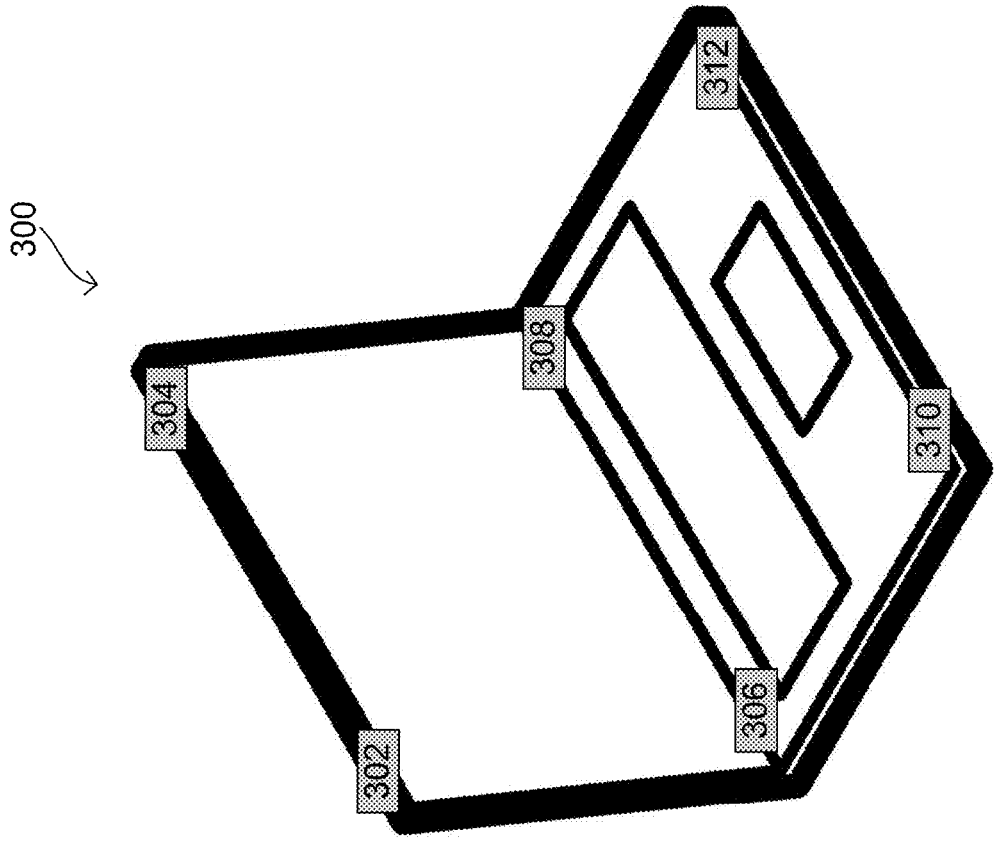

FIGS. 3A and 3B show exemplary wireless communication devices 300 and 350 respectively. Device 300 may include a laptop form factor design which includes antennas for wireless communications. Device 300 may include six antennas systems 302, 304, 306, 308, 310, and 312, similar to antenna 202 of terminal device 102. The antennas systems 302-310 may be strategically placed to maximize isolation between each pair of antennas. Antennas 302, 304, 306, and 308 may be configured for WWAN communication. Additionally, device 300 may include WLAN and WWAN modules not shown.

Device 350 may include a tablet form factor design which includes six WWAN antennas 354, 356, 358, 364, 366, and 368 and two WLAN antennas 352 and 362 similar to antenna 202 of terminal device 102. Antennas 358 and 368 may be configured for mid-band and high-band communication. Antennas 356 and 366 may be configured for low-band and ultra-high-band communication. Antennas 354 and 364 may be configured for communication across all WWAN bands. Antennas 352 and 362 may be configured for WLAN communication. The design of device 350 may include strategically isolating WWAN antennas 354, 356, 358, 364, 366, and 368 from WLAN antennas 352 and 362. Additionally, device 350 may include WWAN module 372 and WLAN module 370.

Switching WWAN communication to the WWAN antenna with the highest isolation with respect to an active WLAN antenna may improve WLAN communication in devices 300 and 350. Switching may be based on antennas isolation LUT, described in further detail below, generated during the design phase of the devices 300 and 305. WLAN module 370 may measure the SNR to determine whether or not to switch WWAN Tx to another antenna, for example by comparing the SNR to an SNR threshold. WLAN module 370 may determine the new WWAN antenna based on its isolation with respect to the WLAN antenna. After switching the WWAN antenna, WLAN module 370 may measure the SNR to ensure that there is an improvement in SNR. If no improvement in SNR is detected, WLAN module 370 may switch WWAN communication to the WWAN antenna with the next best isolation with respect to the WLAN antenna.

For example, WLAN antenna 352 and WWAN antenna 358 may be active simultaneously. WLAN module 370 may determine that the SNR does not satisfy a SNR threshold and initiates a switch form WWAN antenna 358 to WWAN antenna 368 because WWAN antenna 368 has the greatest isolation with respect to WLAN antenna 352. After the switch is completed, WLAN module 370 may determine if there is an improvement in SNR. If an improvement is not detected, WLAN module 370 may initiate a switch form WWAN antenna 368 to WWAN antenna 366 because WWAN antenna 366 has the next best isolation with respect to WLAN antenna 352.

One of the challenges in designing a form factor of a wireless communication device is supporting multiple radio operations in the form factor design without compromising the performance. As the form factor design becomes increasingly thinner and lighter and with a narrower bezel, it becomes more complex to physically separate multiple antennas on the wireless communication device. The design must accommodate multiple antennas in a constrained space, and as a result, achieving higher isolation between the antennas has become challenging.

With the introduction of new and extended frequency bands such as N77, N78, N79, it has become even more challenging to support the simultaneous operation of WWAN and WLAN. For example, supporting WWAN frequency bands B40, B41, B7 with WLAN 2.4 GHz frequency bands or supporting WWAN frequency band N79 with WLAN 5 GHz frequency bands.

WWAN Tx antennas may be fixed based on its configuration. For example, being configured for a single band or Evolved Universal Terrestrial Radio Access—New Radio (EUTRA-NR) Dual Connectivity (ENDC) cases. Since Tx antenna configuration may be fixed, the isolation between WWAN antennas and WLAN antennas may be the same in different configurations. For example, device 300 includes a laptop design form with different modes of operation such as open lid, closed lid, etc. In each mode the isolation between the WWAN antennas and WLAN antennas may be different.

As shown in FIGS. 3A and 3B, the WWAN antennas are distributed over their respective form factors and the isolation between the WWAN antennas and the WLAN antennas may vary based on the proximity, coupling and system constraints etc. The WWAN antennas that are located far away from the WLAN antenna achieve better isolation compared to the ones that are placed closer to the WLAN antennas. It may not be feasible to always keep the WWAN Tx antenna away from the WLAN antenna due to WWAN performance constraints such as the limit on the cable insertion loss and other system constraints.

The WLAN antennas 310 and 312 of device 300 includes are positioned on the mother-board side or base side of the laptop form factor design. The WWAN antennas 302, 304, 306, and 308 are positioned on the lid and near the hinge of device 300. The isolation between the antennas varies based on the mode of operation of device 300. For example, in the open lid mode, the WWAN antennas 302 and 304 will have higher isolation with respect to WLAN antennas 310 and 312 as compared to WWAN antennas 306 and 308. In the closed lid mode, when device 300 is used with an external monitor, the WWAN antennas 306 and 308 will have higher isolation with respect to WLAN antennas 310 and 312 as compared to WWAN antennas 302 and 304 because they will come closer to WLAN antennas 310 and 312. Similarly, in a tent mode or 360 degree tablet mode, the isolation will vary.

Figure 4:
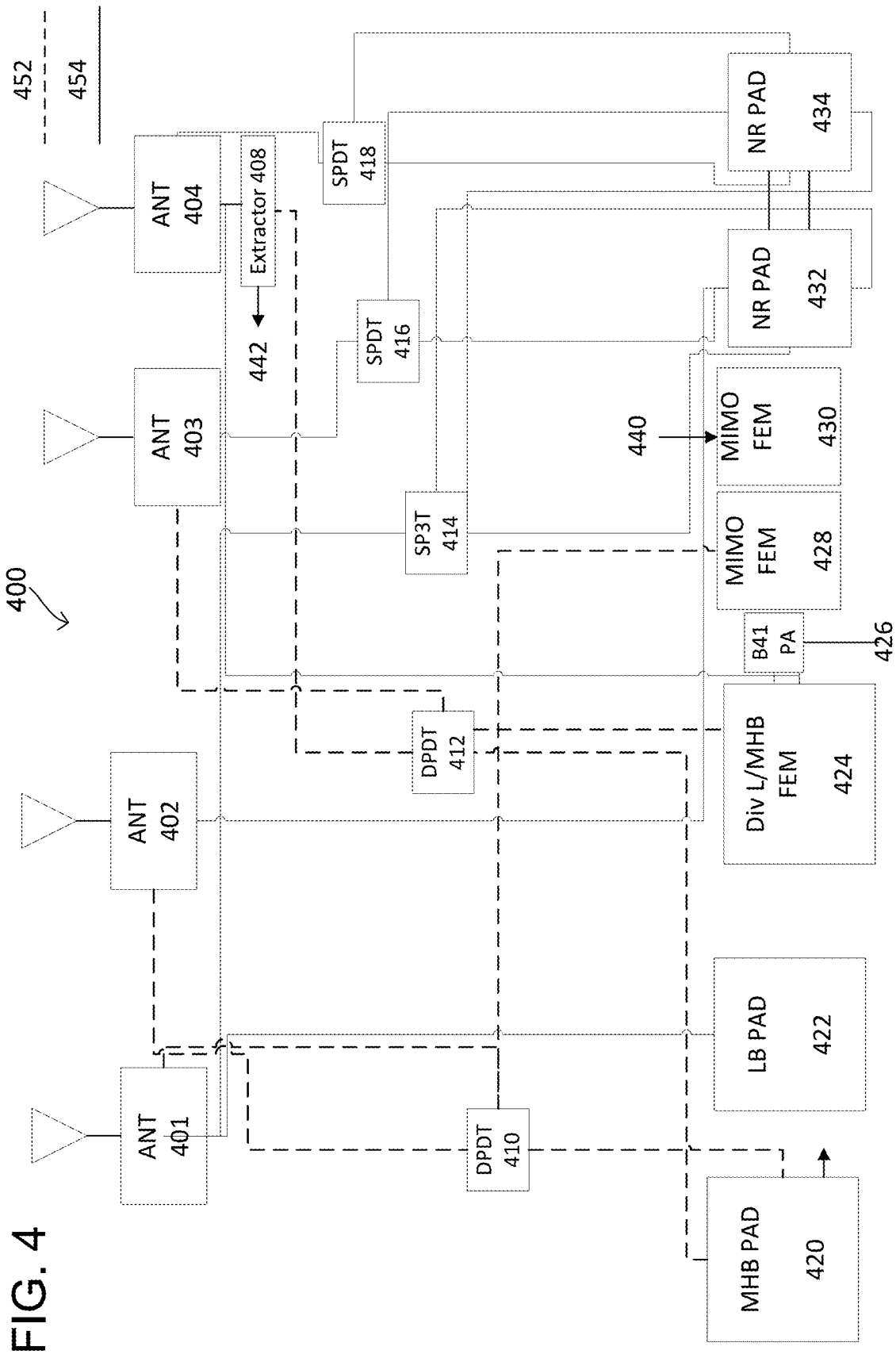
FIG. 4 illustrates an exemplary radio frequency front end of a 5G modem.

FIG. 4 shows a 5G modem 400 front-end architecture containing multiple antennas. Modem 400 may be the same as modem 206 described in FIG. 2 and may be included in devices 300 and 350 of FIGS. 3A and 3B respectively. The configuration of 5G modem 400 may include different switches to support BAS (Best Antenna Selection). For example, modem 400 may include two double pole, double throw (DPDT) switches 410 and 412, two single pole, double throw (SPDT) switches 416 and 418, and one single pole, three throw (SP3T) switch 414. A processor may control switches 410-418 to switch the transmission chain among antennas 401-404. The transmit receive chains, illustrated by dashed line 452, may be designated as a transmit only chain. A switching mechanism may switch the transmission chain between one of the four antennas 401-404. 5G modem 400 may include other mid-high diversity components which are electronically coupled, as illustrated by solid line 454. For example, mid-high band (MHB) power amplifier duplexer (PAD) 410, low band (LB) PAD 422, Divergence L (Div L)/MHB front-end module (FEM) 424, B41 power amplifier (PA) 426, Multiple-In, Multiple-Out (MIMO) FEMs 428 and 430, and New Radio (NR) PADs 432 and 434. It should be noted that not all components may be required for MHB diversity and that other components, not shown, may be included. Other configurations of a modem front end may also allow for antennas switching as described in this disclosure. The present disclosure takes advantage of modem front end architectures to switch the antenna without adding any additional cost or without degrading existing performance.

The present disclosure proposes to use multi antenna configurations along with switching mechanisms to switch the transmit signal among the available antennas based on SNR and isolation between WWAN and WLAN antennas. This may reduce interference between simultaneous WWAN and WLAN transmission. This will in-turn improve the system performance and link reliability.

Transmission can take place through each of the four antennas 401-404 by using the switches 410-418. The main TRX path is highlighted by a dotted line 456 and the RX paths (MIMO) are highlighted by dashed line 452 in FIGS. 7-10. For this example, the Mid and High bands (MHB) are considered.

NRT and RT coexistence techniques may be more expensive or less robust as compared to the antenna switching techniques described in this disclosure. An NRT coexistence technique may require a high rejection BAW filter to support simultaneous operation of WWAN and WLAN antennas. BAW filters are expensive and increase the system cost without eliminating the problem of interference between WWAN and WLAN communication. An NRT coexistence technique may limit availability of channels for WLAN communication to channels with lower interference from WWAN communication. RT coexistence techniques may limit throughput of WLAN communication.

Antenna switching techniques for simultaneous WWAN and WLAN communication may be a more cost effective technique as compared to NRT techniques because BAW filters are not required. In contrast, antenna switching may use less expensive Surface Acoustic Wave (SAW) filters as the coexistence filter. Additionally, antenna switching techniques for simultaneous WWAN and WLAN communication do not limit the WLAN communication channels as compared to the antenna switching technique discussed in this disclosure.

Figure 5:
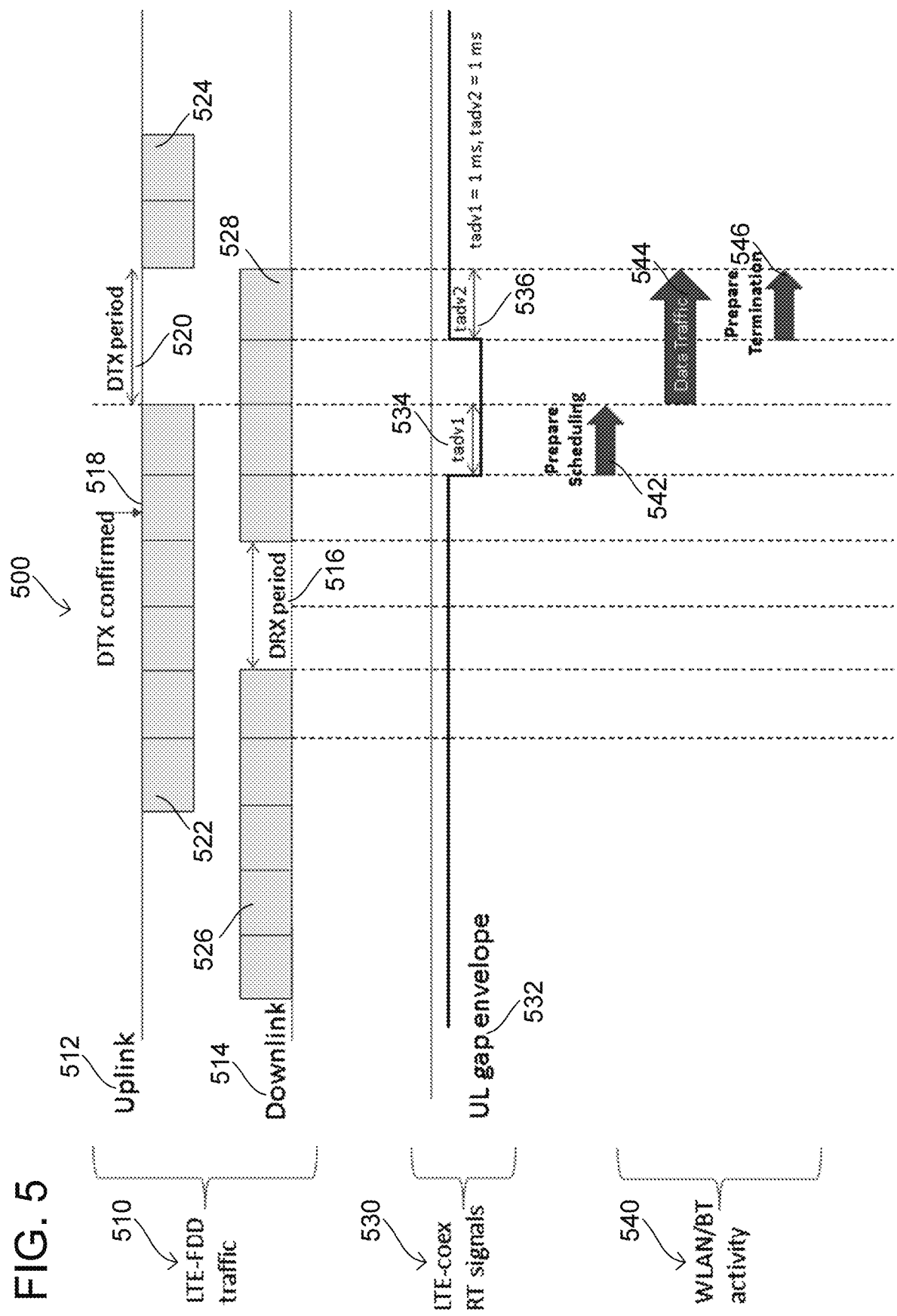
FIG. 5 illustrates an exemplary real time (RT) coexistence technique.

FIG. 5 shows a representation 500 of an RT coexistence technique. Representation 500 includes WWAN communication 510, coexistence signal 530, and WLAN communication 540. WWAN communication 510 may include uplink (UL) 512 and downlink (DL) 514. UL 512 may include period of discontinuous Tx (DTx) 520 between transmissions 522 and 424. DTx confirmation 518 may be established in the second to last subframe of transmission 522, which is at least 1 ms before DTx period 520 begins. DL 514 may include period of discontinuous reception (DRx) 516 between receptions 526 and 528.

Coexistence signal 530 reduces interference between WLAN communication 540 and WWAN communication 510. For example, coexistence signal 530 may us UL gap envelope 532 to identify the DTx period 520 of UL 512 and schedule WLAN communication 540 during DTx period 520. Coexistence signal 530 may include indications 534 and 536 which indicate when DTx period 520 starts and ends respectively. Indications 534 and 536 may be given 1 ms in advance. It should be noted that other timeframes may be used for indications.

A WLAN module (not shown) may execute preparation instruction 542 based on indication 534. Preparation instruction 542 may begin 1 ms before the beginning of DTx period 520. Further WLAN module may execute WLAN traffic 544 during DTx period 520 based on preparation instruction 542. The WLAN module may execute termination instruction 546 based on indication 536. Termination instruction 546 may begin 1 ms before the end of DTx period 520. Further WLAN module may end WLAN traffic 544 based on termination instruction 546.

RT coexistence techniques, such as the one described with respect to FIG. 5, help improve the coexistence performance of WWAN and WLAN communications. However, the techniques reduce WLAN through-put due to time sharing. Hence it is better to avoid RT coexistence algorithms as long as the coexistence performance can be achieved with NRT coexistence techniques. Antenna switching techniques proposed in this disclosure take advantage of NRT coexistence techniques which do not degrade WLAN throughput as compared to RT coexistence techniques. Building antenna switching techniques on top of NRT coexistence techniques avoids requiring expensive BAW filters. Antenna switching techniques use less expensive SAW filters as a coexistence filter.

This disclosure discusses improving coexisting WWAN and WLAN communication based on isolation between WWAN and WLAN antennas. An LUT can be created during the design phase of a wireless communication device indicating an isolation measurement in dB between WWAN and WLAN antennas.

FIG. 6 shows LUT 600. LUT 600 may include column 602 to indicate a wireless communication device scenario. For example, laptop 300 may be capable of different configurations. It should be noted that other WWAN and WLAN operating bands may be included in LUT 600. As shown in FIG. 6, may include scenario 618 for an open lid, scenario 620 for a closed lid, scenario 622 for a tent mode, and scenario 624 for a 360 degree mode. Additionally, the LUT can include column 604 to indicate a WWAN operating band and column 606 to indicate a WLAN operating band. Column 608 indicates which WLAN antenna is associated with the row in LUT 600. Columns 610, 612, 614, and 616 indicate the isolation of a WWAN antenna with respect to the WLAN antenna indicated in column 608. For example, column 610 indicates the isolation of a first WWAN antenna with respect to WLAN antenna indicated in column 608 for each scenario of column 602 and the combination of coexisting operating bands indicated in columns 604 and 606.

Antenna switching may be based on antenna isolation LUT 600. As shown in FIG. 6, the highlighted cells in columns 610, 612, 614, and 616 indicate the best isolation for each condition indicated in that row. After switching antennas, a WLAN module may measure the SNR to verify an SNR improvement. For example, looking at the first row of LUT 600 where scenario 618, WWAN operating band B40, WLAN operating band 2.4 GHz, WLAN traffic may be transmitted on a first WLAN antenna and WWAN UL may be transmitted on a first WWAN antenna. Based on LUT 600, a second WWAN antenna may have a better isolation from the first WLAN antenna given the scenario and operating bands. Therefore, a WLAN module may switch WWAN transmission from the first WWAN antenna to the second WWAN antenna. If the SNR has not improved, the intelligent antenna switching algorithm may initiate the antenna switching to the next best isolation option as indicated in LUT 600. This step may repeat until there is an improvement in SNR.

Figure 7:
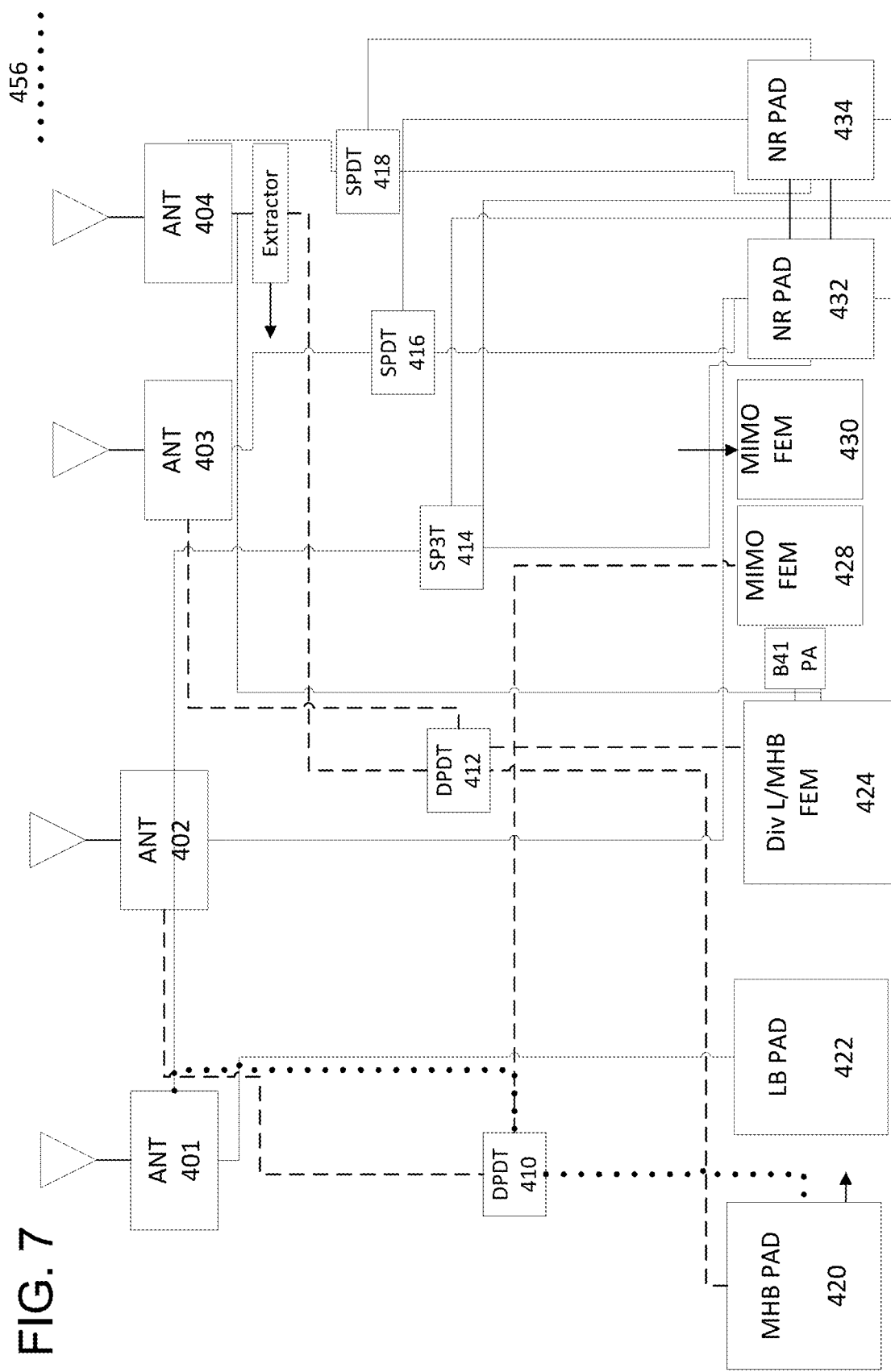
FIGS. 7-10 illustrate exemplary switching TX between one of 4 antennas in a wireless communication device.

FIGS. 7-10 shows modem FE 400 at different points in time during antenna switching. FIG. 7 shows modem FE 400 at a first point in time where the transmit chain, illustrated by dotted line 456, is transmitting through antenna 401. All other TRx chains are used for reception (Rx) only, using antennas 402, 403, and 404.

Figure 8:
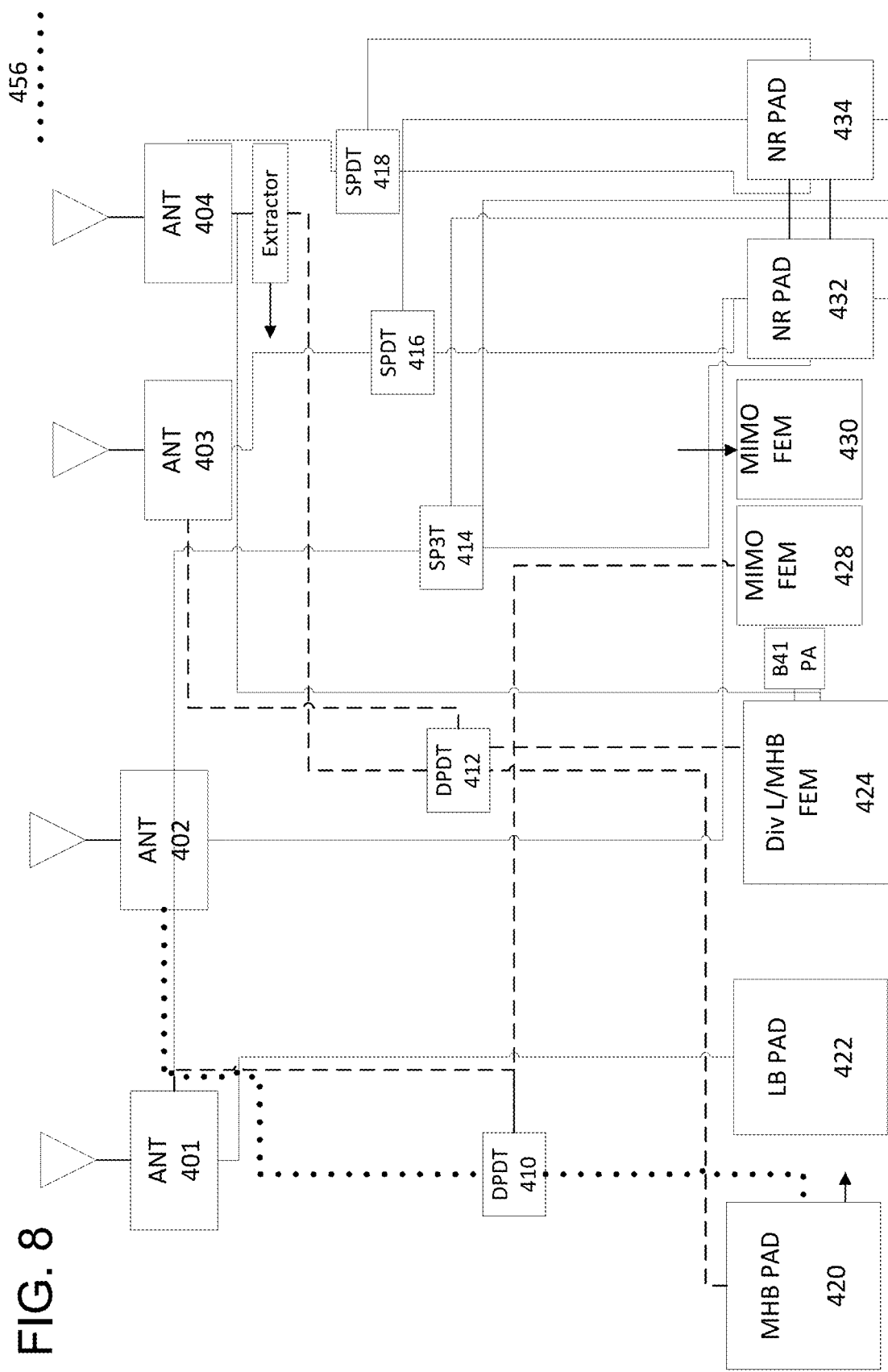

FIG. 8 shows modem FE 400 at a second point in time where the transmit chain, illustrated by dotted line 456, is changed from antenna 401 to antenna 402 using switches 410-418. All other TRx chains are used for Rx only, using antennas 401, 403, and 404.

Figure 9:
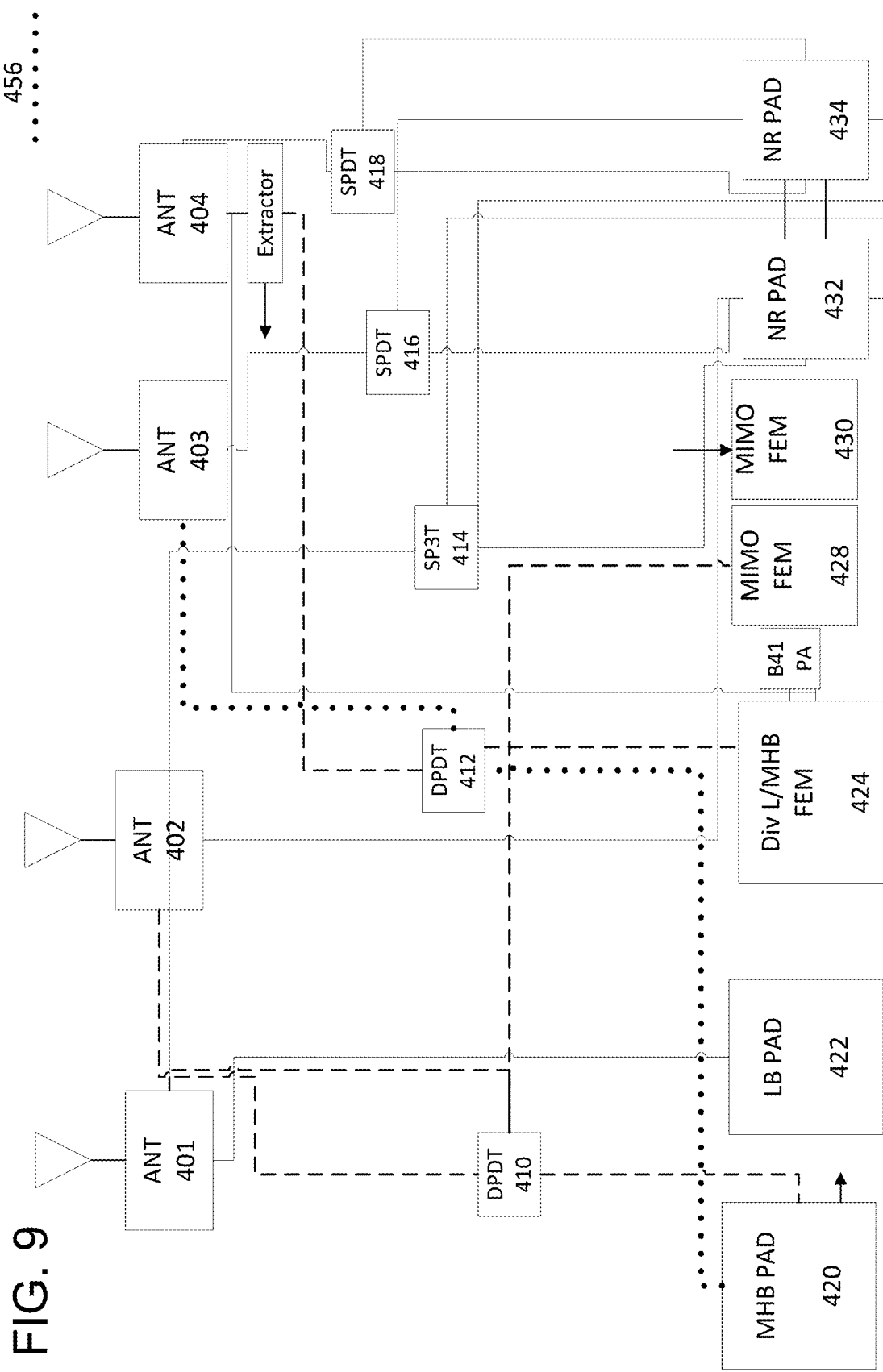

FIG. 9 shows modem FE 400 at a third point in time where the transmit chain, illustrated by dotted line 456, is changed from antenna 402 to antenna 403 using switches 410-418. All other TRx chains are used for Rx only, using antennas 401, 402, and 404.

Figure 10:
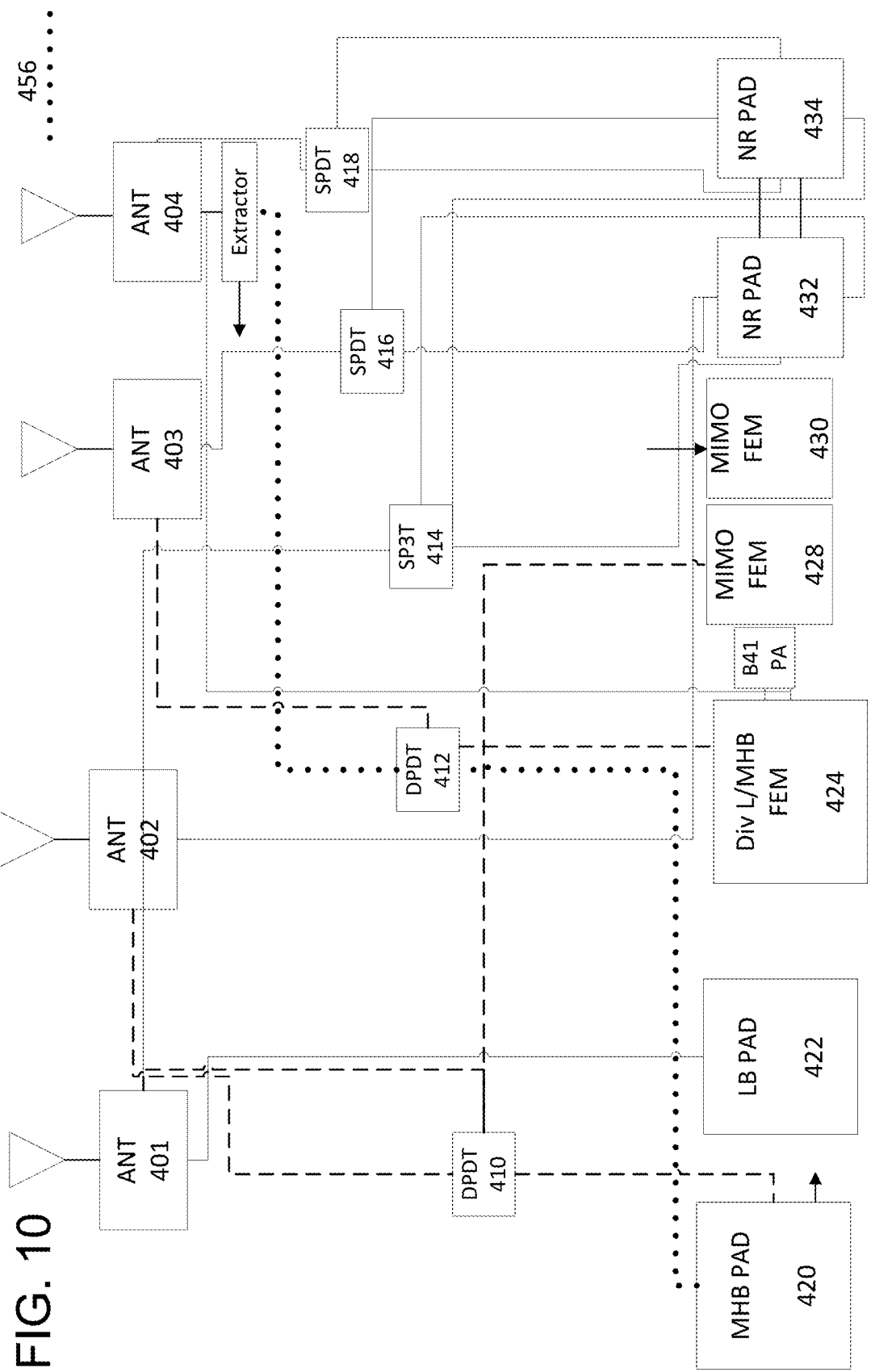

FIG. 10 shows modem FE 400 at a fourth point in time where the transmit chain, illustrated by dotted line 456, is changed from antenna 403 to antenna 404 using switches 410-418. All other TRx chains are used for Rx only, using antennas 401, 402, and 403.

The transmission chain path may be calibrated during antenna switching. During the calibration process, the entire four antennas paths are calibrated to ensure use of the correct power output at the antenna ports during normal operation and SRS. Calibrating the TX path may make use of the same calibration table used for traditional UE operation. Therefore, no additional effort or time is required for calibration during the design of a UE device.

It should be noted that these changes are illustrative only. The transmit chain can be changed between any two antennas. For example, changing the transmit chain from antenna 403 to antenna 401. The subsequent antenna may be chosen based on an isolation between the two antennas. A best antenna selection algorithm may be used to determine the best subsequent antenna based on LUT 600. The algorithm may make the determination based on antennas isolation and operating bands as indicated in LUT 600 as well as any other number of factors.

The modem FE 400 may include switches to support BAS, SRS and MIMO requirements. Making use of these switches to select different antenna for transmission does not require additional components. Therefore, there will be no additional insertion loss to the front end and no degradation in the performance.

When switching the transmit chain between the antenna, the MIMO operation will continue to function as normal without degrading the receiver throughput performance.

FIG. 11 shows an exemplary chart 1100 showing the switching times of switches in a 5G modem, such as modem FE 400. For example, the switching time of the SPDT/DPDT switches is low enough to not cause any degradation in performance. As shown in chart 1100, the typical switching time 1102 is 2.5 μs with a maximum switching time 1104 being 3 μs 1104. Using a 5G modem FE with switches with similar switching times will avoid degradation.

During the calibration process, the entire four antennas paths are calibrated to ensure the correct power output at the antenna ports during normal operation and sounding reference signal (SRS). Antenna switching may make use of the same calibration table when antenna switching takes places. No additional effort or time is required for calibration during the build.

Figure 12:
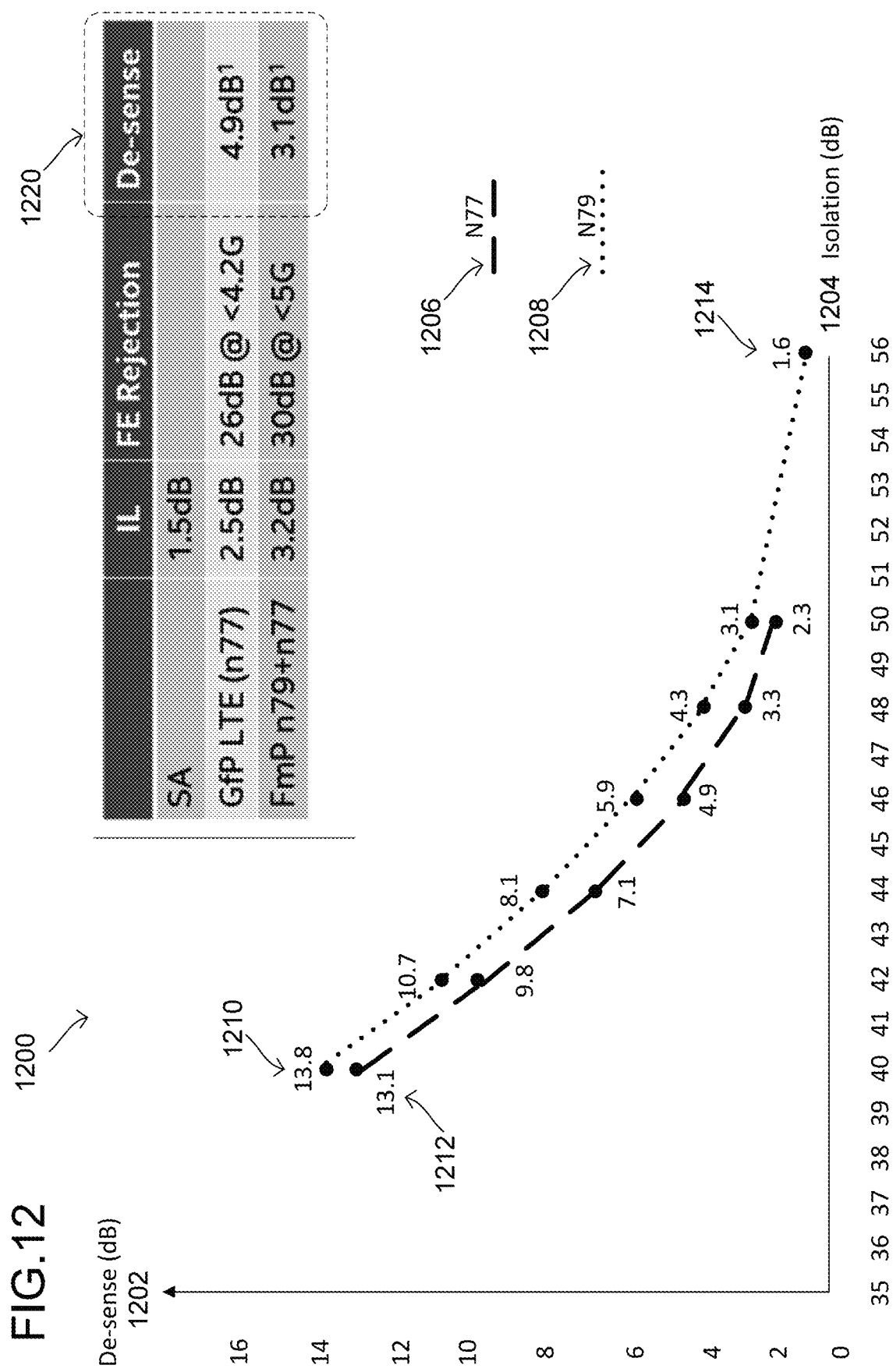
FIG. 12 illustrates an exemplary packet error rate (PER) due to RF interference.

FIG. 12 shows an exemplary chart 1200 of WLAN enhancement with improved antenna isolation. Chart 1200 includes de-sense measurements 1202 as a function of antenna isolation 1204. Line 1206 indicates an WWAN operating band N77. Line 1208 indicates an WWAN operating band N79. Lines 1206 and 1208 show that de-sense decreases as the WLAN antenna isolation increases. For example, line 1208 starts at a WLAN antenna isolation of 40 dB at point 1210 with a de-sense of 13.8 dB. As WLAN antenna isolation improves to 56 dB, de-sense improves to 1.6 dB at point 1214. Line 1206 starts at point 1212 with a WLAN antenna isolation of 40 and de-sense of 13.1 dB and improves to a de-sense of 2.3 dB as WLAN antenna isolation increases to 50 dB. De-sense column 1220 shows different de-sense values for given operating bands and isolations.

As shown in FIG. 12, any improvement in the antenna isolation (even a 1 dB improvement) between WWAN and WLAN antennas can significantly improve the de-sense performance. The data of FIG. 12 uses Garfield-peak (GfP) and Filmore-peak (FmP) de-sense measurements.

From the data in FIG. 12, we observe a de-sense of 4.9 dB and 3.1 dB, see column 1220, in GfP and FmP. If antenna isolation is improved by using the disclosed antenna switching mechanism, the sensitivity degradation may be avoided.

Figure 13:
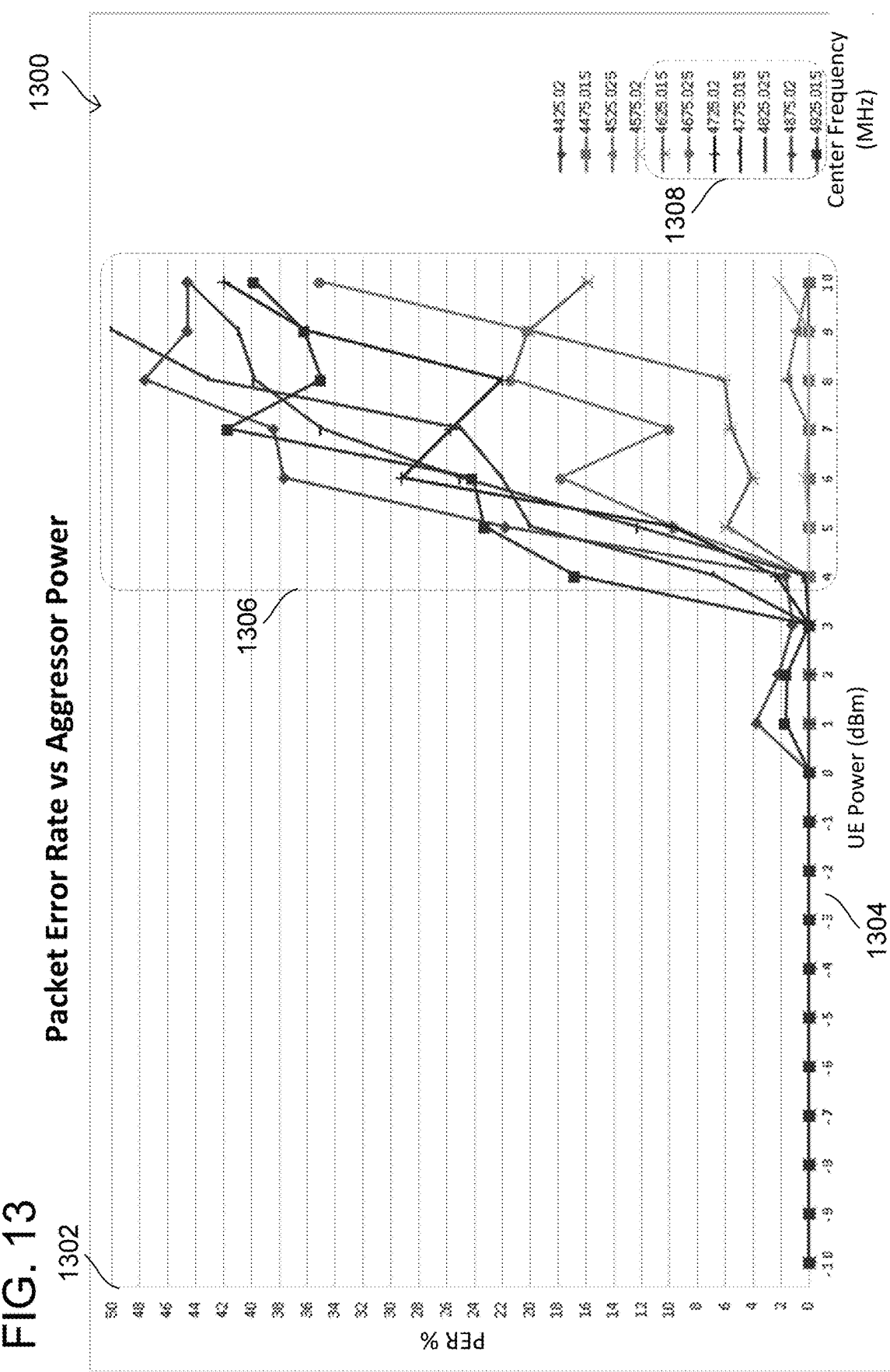
FIG. 13 illustrates an exemplary impact on performance due to switching.

FIG. 13 shows chart 1300 of package error rate (PER). Chart 1300 includes vertical axis 1302 which represents PER. Chart 1300 includes horizontal axis 1304 which represents a power level in decibel milliwatts (dBm). Chart 1300 shows the PER vs LTE Tx power for GfP LTE stock keeping unit (SKU). Chart 1300 represents the PER at different aggressor power levels for different channels. For example, chart 1300 shows WWAN Tx power (horizontal axis 1304) vs. WLAN PER (vertical axis 1302) for different WWAN channels. In this representation of measurements, the PER remains within an acceptable range until 2 dBm to 3 dBm and then degrades exponentially. Region 1306 shows the PER above the acceptable range. Channels 1306 above a center frequency of 4600 MHz generate an unacceptable PER. Any improvement in the WWAN and WLAN antennas isolation will significantly help to improve the PER performance. For example, an improvement of 3 dB to 4 dB of antenna isolation will directly improve the WLAN Rx sensitivity.

Figure 14:
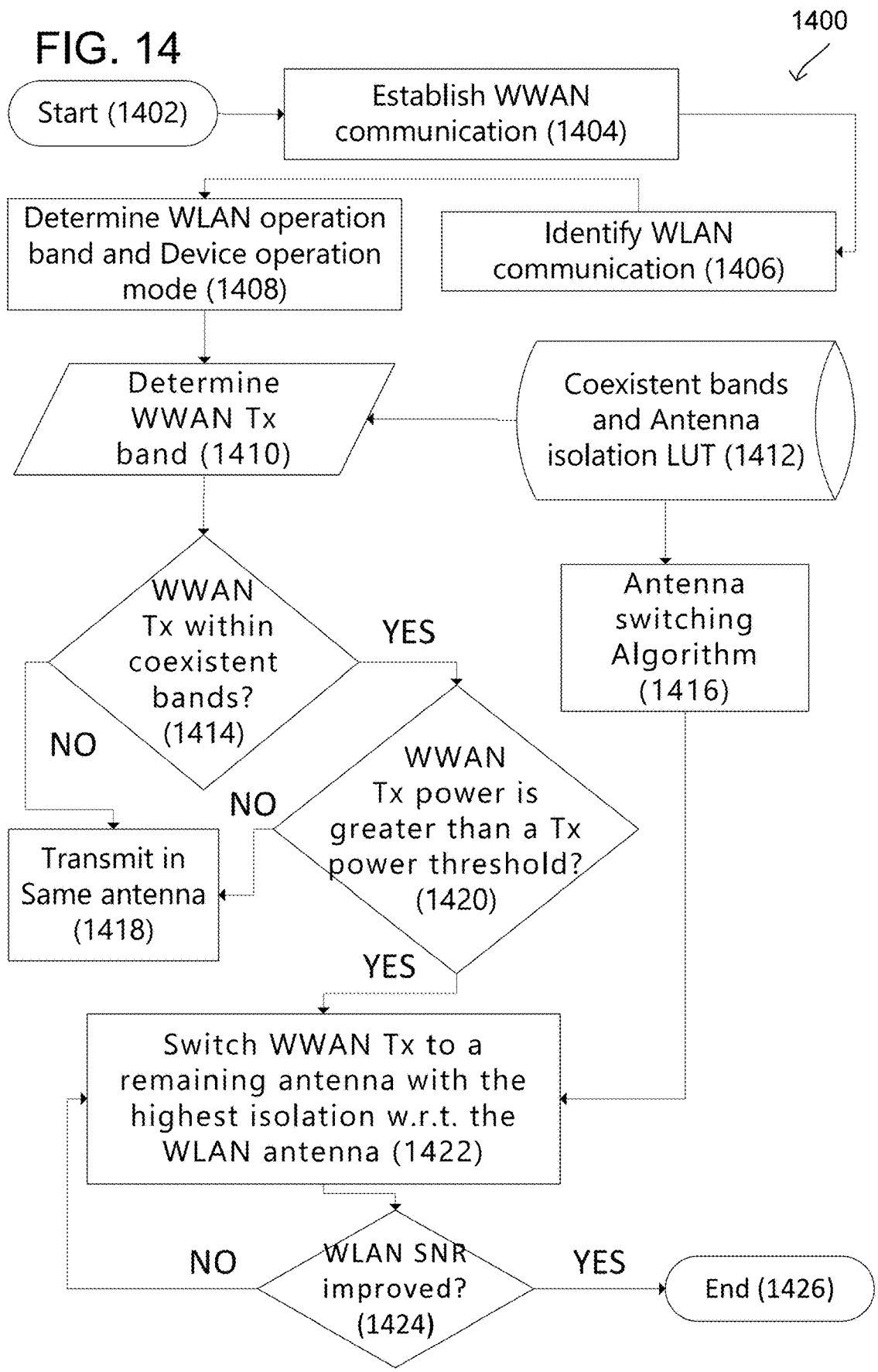
FIG. 14 illustrates an exemplary flow chart of a method for switching antennas.

FIG. 14 shows a method 1400 for switching a communication. For example, switching a WWAN transmission signal to a WWAN antenna which has the highest isolation with respect to an active WLAN antenna. Method 1400 may begin at step 1402. Step 1404 may establish a WWAN communication. Step 1406 may identify a WLAN communication. The WLAN communication and WWAN communication may occur simultaneously or concurrently. Step 1408 may determine an operation band of the WLAN communication as well as determine an operation of mode of the host wireless communication device. Step 1410 may determine a Tx band of the WWAN communication and receive information from LUT 1412. The information from LUT may include information for coexistent WWAN bands and WLAN bands as well as operating modes, such as information available in LUT 600. For example, operation mode of a laptop such as open lid, closed lid etc. To switch the WWAN transmission to the highest isolation antenna, isolation measurements between all WLAN and WWAN antenna in all modes of operation may be recorded in a LUT during the system design phase of a wireless communication device. During the operation, the wireless communication device, or host, may indicate to a WWAN module the WLAN band of operation a wireless communication device mode of operation. For example, the wireless communication device may be report WLAN operation band such as low band (LB), high band (HB), or ultra high band (UHB) to the WWAN module. Additionally, the host may report the wireless communication device mode of operation such as open lid or closed lid to the WWAN module. Step 1414 may determine if the WWAN Tx band is included in LUT 1412. If the WWAN module is operating in WWAN bands which are not listed in LUT 1412, WWAN module continues to step 1418 and continues to transmit the WWAN signal from the current WWAN antenna. If the WWAN module is operating in WWAN bands which are adjacent to WLAN bands and are listed in the LUT, step 1420 may determine if the Tx power level is higher than a power threshold at step 1420. If step 1420 determines that the power level is less than the power level threshold, WWAN module continues to step 1418 and continues to transmit the WWAN signal from the current WWAN antenna. If the WWAN module determines that that Tx power level is greater than the power threshold, the WWAN module may switch its transmit signal to the WWAN antenna which has the highest isolation from the active WLAN antennas at step 1422. Step 1416 may determine the next best WWAN Tx antenna based on LUT 1412 and transmit the next best antenna information to step 1422. Thereby, the isolation will be improved between the WWAN and WLAN antennas which in turn helps to improve the coexistence performance between WWAN and WLAN communications. Step 1424 may measure the signal to noise ratio (SNR) of the WWAN transmission on the current WWAN antenna and compare it to the SNR of the WWAN transmission from the previously active WWAN antenna. If the current SNR is greater than the previous SNR, step 1424 returns to step 1422 and tries the next antenna with the next best isolation with respect to the WLAN antenna. Steps 1422 and 1424 iterate through the WWAN antennas from greatest to least isolation with respect to the active WLAN antenna until there is an improvement in SNR or it has iterated through all of the WWAN antennas. If not SNR improvement is found, method 1400 may switch the WWAN Tx antennas back to the original WWAN Tx antenna (not shown). If step 1424 determines that there is an improvement in SNR, method 1400 ends.

LUT 1412 may be part of the WWAN modem configuration file and may be integrated into modem firmware, such as modem 400. Exemplary LUT 600 for device 300 may list the isolation of every WWAN antenna with respect to WLAN antenna. Antenna selection algorithm 1416 may choose the best antenna based on the isolation numbers. For example, the highlighted cells in LUT 600. When WWAN B40 band and WLAN 2.4 GHz band coexist, the WWAN B40 transmission will take place over WWAN antenna-2 in the open lid mode. If a user switches to closed-lid mode, the WWAN antenna-2 will come closer to the WLAN antennas resulting in decreased isolation. Therefore, in the closed lid scenario, WWAN transmission will switch from WWAN antenna-2 to WWAN antenna-4 to maintain highest isolation between the WWAN and WLAN antennas.

Similarly, for the tablet form factor device 350, as shown in FIG. 3B, a similar LUT may be generated based on the use cases supported by device 350. During actual operation, the device may indicate to a WWAN module with WLAN operation band information such as LB, or HB/UHB and the system mode of operation. If the WWAN module is operating in the bands which are adjacent to WLAN bands and are listed in the LUT, the WWAN module switches its transmit signal to the antenna which has the highest isolation to the WLAN antennas. Thereby, the isolation will be improved between the WWAN and WLAN antennas which in turn helps to improve the coexistence performance.

As shown in FIG. 4, the 5G modem FE architecture may contain multiple antennas configurations. For example, Main, Diversity, MIMO-1, and MIMO-2 antennas. Additionally, the FE architecture may contain different switches to support Best Antenna Selection (BAS), SRS switching, and MIMO. This disclosure makes use of the existing modem FE architecture to switch the antenna without adding any additional cost or without degrading existing performance.

LUT 600 may cover antenna isolation for various operating modes. In addition to the static LUT switching mechanism, method 1400 may include WLAN SNR monitoring and provide feedback at step 1424 to the WWAN module to determine if the selection of the antenna improved the SNR. This may further improve the robustness of antenna switching algorithm 1416.

For example, consider a coexistence case of WWAN band B40 and WLAN band 2.4 GHz in an open lid mode, as shown in the first row of LUT 600. In this case, as previously discussed, the B40 transmission will be transmitted through WWAN antenna-2 and Wi-Fi transmission will take place through WLAN ANT1. If a user switches to closed-lid mode, the WWAN antenna-2 will come closer to the WLAN antennas resulting in decreased isolation. As shown in FIG. 6, the WWAN antenna-4 has a greater isolation as compared to WWAN antenna-2. Therefore, WWAN transmission should switch from WWAN antenna-2 to antenna-4 as this combination maintains the highest isolation at step 1422. After switching, method 1400 may measure the SNR and verify if it has improved at step 1424. If the SNR has not improved due to change in isolation because of near field effect/loading of antennas/platform RFI etc., antenna switching algorithm 1416 may initiate step 1422 again to the next best WWAN antenna as determined by algorithm 1416. This may repeat until method 1400 determines an improvement in SNR.

When the antenna switching takes place as discussed with respect to FIG. 14, the MIMO operation function as designed. If the WWAN Tx antenna is switched from the main antenna to a different antenna (Diversity or MIMO), the newly selected antenna will become the main antenna and the remaining antennas will act as the MIMO antennas. Hence, there will not be any impact on the performance.

Figure 15:
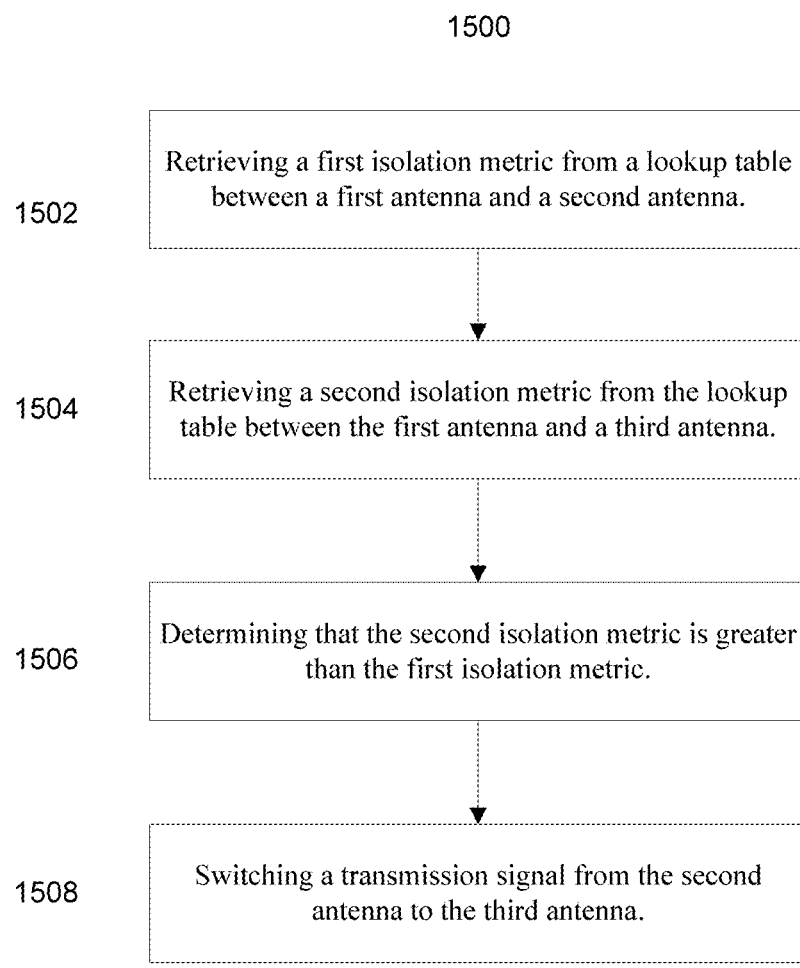
FIG. 15 illustrates an exemplary flow chart of a method for switching antennas.

FIG. 15 shows an exemplary method 1500 of antenna switching. As shown in FIG. 15, method 1500 includes retrieving a first isolation metric from a lookup table between the antenna and the first further antenna (stage 1502); retrieving a second isolation metric from a lookup table between the antenna and the second further antenna (stage 1504); determining that the second isolation metric is greater than the first isolation metric (stage 1506); and switching a transmission signal from the first further antenna to the second further antenna. (stage 1508).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The terms "group," "set", "sequence," and the like refer to a quantity equal to or greater than one.

Any term expressed in plural form that does not expressly state "plurality" or "multiple" similarly refers to a quantity equal to or greater than one.

The term "lesser subset" refers to a subset of a set that contains less than all elements of the set.

Any vector and/or matrix notation utilized herein is exemplary in nature and is employed for purposes of explanation. This disclosure may be described with vector and/or matrix notation are not limited to being implemented with vectors and/or matrices and the associated processes and computations may be performed in an equivalent manner with sets or sequences of data or other information.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, embodiments, or designs.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of with regard to a group of elements may be used herein to mean at least one element from the group consisting of the elements. For example, the phrase "at least one of with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. The circuitry may be implemented in, or functions associated with the circuitry may be implemented by, one or more software or firmware modules. Circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The terms "communicate" and "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8

(Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Examples described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where e.g. the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Examples described herein can also implement a hierarchical application of the scheme, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. i.e., some or all features defined for network equipment may be implemented by a UE.

Some examples may be used in conjunction with Radio Frequency (RF) systems, radar systems, vehicular radar systems, autonomous systems, robotic systems, detection systems, InfraRed (IR) systems, or the like. For example, with respect to systems, e.g., Light Detection Ranging (LiDAR) systems, and/or sonar systems, utilizing light and/or acoustic signals.

This disclosure may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication device comprising:
   a processor configured to:
   determine a first operating band of a first wireless communication on a first antenna;
   determine a second operating band of a second wireless communication on a second antenna;
   determine a first isolation metric between the first antenna and the second antenna based on the first operating band and the second operating band;
   determine a second isolation metric between the first antenna and a third antenna based on the first operating band and the second operating band;
   compare the first isolation metric with the second isolation metric; and
   switch the second wireless communication from the second antenna to the third antenna based on the comparison;
   wherein the processor is further configured to:
   determine a signal to noise ratio (SNR) of the first wireless communication;
   compare the SNR to an SNR threshold; and
   switch the second wireless communication from the third antenna to a fourth antenna based on the comparison.

2. The mobile communication device of claim 1, wherein the first isolation metric and the second isolation metric are stored in a lookup table (LUT).

3. The mobile communication device of claim 1, wherein the processor is further configured to:
   determine a second SNR after switching the second wireless communication from the second antenna to the third antenna; and
   initiate a second switch based on a comparison of the SNR and the second SNR.

4. The mobile communication device of claim 1, wherein the processor is further configured to:
   determine that the first operating band and the second operating band are adjacent; and
   determine that the first operating band and the second operating band are configured to coexist.

5. The mobile communication device of claim 4, wherein the processor is further configured to:
   receive coexistent band information from a lookup table (LUT); and
   switch the second wireless communication from the second antenna to the third antenna based on the coexistent band information.

6. The mobile communication device of claim 1, wherein the processor is further configured to:
   determine an operating mode of the mobile communication device; and
   switch the second wireless communication from the second antenna to the third antenna based on the operating mode.

7. The mobile communication device of claim 1, wherein the processor is further configured to:
   determine a power level of the first wireless communication;
   compare the power level to a power threshold; and
   switch the wireless communication from the second antenna to the third antenna based on the comparison.

8. A method comprising:
   determining a first operating band of a first transmission on a first antenna;
   determining a second operating band of a second transmission on a second antenna;
   determining a first antenna isolation metric between the first antenna and the second antenna;
   determining a second antenna isolation metric between the first antenna and a third antenna;
   comparing the first isolation metric and the second isolation metric; and
   switching the second transmission from the second antenna to the third antenna based on the comparison and further based on the first operating band or the second operating band.

9. The method of claim 8, further comprising:
   determining a device operating mode; and
   switching the second transmission from the second antenna to the third antenna further based on the operating mode.

10. The method of claim 9, further comprising:
    determining a first transmission power level; and
    switching the second transmission from the second antenna to the third antenna based on the power level.

11. The method of claim 10, further comprising:
    determining a first signal to noise (SNR), wherein the first SNR is measured before switching;
    determining a second SNR, wherein the second SNR is measured after switching; comparing the first SNR and the second SNR; and
    initiating a second switch based on the comparison.

12. The method of claim 10, further comprising:
    determining that the first operating band and the second operating band are adjacent;

determining that the first operating band and the second operating band are configured to coexist based on a band information from a lookup table (LUT); and switching the second transmission from the second antenna to the third antenna further based on the band information.

13. A method comprising:

retrieving a first isolation metric from a lookup table between a first antenna and a second antenna;

retrieving a second isolation metric from the lookup table between the first antenna and a third antenna;

determining that the second isolation metric is greater than the first isolation metric;

determining a first operating band of a first transmission;

determining a second operating band of a second transmission;

determining a device operating mode;

switching a signal transmission from the second antenna to the third antenna based on the first operating band or the second operating band and further based on the operating mode.

14. The method of claim 13, further comprising:

determining a first transmission power level; and switching the signal transmission from the second antenna to the third antenna further based on the power level.

15. The method of claim 14, further comprising:

determining a first signal to noise (SNR), wherein the first SNR is measured before switching;

determining a second SNR, wherein the second SNR is measured after switching; comparing the first SNR and the second SNR; and initiating a second switch based on the comparison.

16. The method of claim 14, further comprising:

determining that the first operating band and the second operating band are adjacent;

determining that the first operating band and the second operating band are configured to coexist based on a band information from the lookup table; and switching the signal transmission from the second antenna to the third antenna further based on the band information.

* * * * *